US012637035B2

(12) United States Patent
    Grubauer et al.

(10) Patent No.: US 12,637,035 B2
(45) Date of Patent: May 26, 2026

(54) BRAKE DEVICE AND ELECTRICALLY OPERATABLE AXLE DRIVETRAIN OF A MOTOR VEHICLE

(71) Applicant: Schaeffler Technologies AG & Co. KG, Herzogenaurach (DE)

(72) Inventors: Benedikt Grubauer, Neresheim (DE); Simon Ortmann, Pulheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 19/111,215

(22) PCT Filed: Aug. 14, 2023

(86) PCT No.: PCT/DE2023/100591
    § 371 (c)(1),
    (2) Date: Mar. 12, 2025

(87) PCT Pub. No.: WO2024/056120
    PCT Pub. Date: Mar. 21, 2024

(65) Prior Publication Data
    US 2026/0021794 A1      Jan. 22, 2026

(30) Foreign Application Priority Data

Sep. 15, 2022    (DE) ..................... 10 2022 123 640.4

(51) Int. Cl.
    *B60T 1/06*        (2006.01)
    *F16D 65/18*       (2006.01)
    (Continued)

(52) U.S. Cl.
    CPC ............ *B60T 1/062* (2013.01); *F16D 65/186* (2013.01); *F16D 65/853* (2013.01); *F16D 2121/06* (2013.01)

(58) Field of Classification Search
    CPC ...... B60T 1/062; F16D 55/36; F16D 2121/06; F16D 2055/0058; Y10T 74/19637
    See application file for complete search history.

(56) References Cited

U.S. PATENT DOCUMENTS 3,835,971  A        9/1974   Spanke et al.
6,260,668  B1 *     7/2001   McClanahan ....... F16D 25/0638
                                                         188/71.6
(Continued)

FOREIGN PATENT DOCUMENTS

CN          201062643  Y        5/2008
CN          104769315  A        7/2015
                 (Continued)

OTHER PUBLICATIONS

European Patent Office, International Search Report and Written Opinion received in International Application No. PCT/DE23/100591, Dec. 21, 2023, 18 pages (including translation).
(Continued)

*Primary Examiner* — Toan C To
(74) *Attorney, Agent, or Firm* — Suiter Swantz IP

(57)            ABSTRACT

A brake device for an electrically operatable axle drivetrain of a motor vehicle includes a hydraulic disengaging system comprising a central disengaging element which actuates a friction device such that the friction device operates in a braking or non-braking state. The central disengaging element has a central disengaging element housing comprising a central disengaging element piston chamber in which a central disengaging element piston is received in an axially movable manner by means of a hydraulic liquid. The central disengaging element has at least one central disengaging element piston seal which seals off the central disengaging element piston from the central disengaging element piston chamber, and the central disengaging element and the friction device are received in a brake housing, the brake (Continued)

housing including a first pot-shaped housing part and a second lid-shaped housing part which at least partly covers the first pot-shaped housing part.

17 Claims, 4 Drawing Sheets

(51) Int. Cl.
    *F16D 65/853*          (2006.01)
    *F16D 121/06*         (2012.01)

(56)              References Cited

U.S. PATENT DOCUMENTS

| | | | |
|---|---|---|---|
| 6,415,901 B1 | 7/2002 | Usoro | |
| 7,481,735 B2 | 1/2009 | Moon | |
| 7,493,992 B2 * | 2/2009 | Rogers | F16D 65/186 |
| | | | 180/370 |
| 8,499,659 B2 | 8/2013 | Benson et al. | |
| 8,662,277 B2 * | 3/2014 | Schoon | B60T 13/22 |
| | | | 475/331 |
| 8,887,880 B2 * | 11/2014 | Cliff | F16D 65/853 |
| | | | 188/264 D |
| 11,181,184 B2 * | 11/2021 | Base | F16H 57/0457 |
| 2005/0279605 A1 | 12/2005 | Sowul et al. | |
| 2021/0396286 A1 * | 12/2021 | Davis | F16D 55/40 |

FOREIGN PATENT DOCUMENTS

| | | |
|---|---|---|
| CN | 111692244 B | 1/2022 |
| DE | 102016105112 A1 | 9/2016 |

OTHER PUBLICATIONS

Schneider et al., "Highly Integrative and Flexible Electric Drive Unit for Electric Vehicles," German Automotive Magazine ATZ, vol. 113, May 2011, 6 pages.

* cited by examiner

BRAKE DEVICE AND ELECTRICALLY OPERATABLE AXLE DRIVETRAIN OF A MOTOR VEHICLE

CROSS-REFERENCE TO RELATED APPLICATION

The present application is the U.S. National Phase of PCT Patent Application Number PCT/DE2023/100591, filed on Aug. 14, 2023, which claims priority to German Patent Application Number 10 2022 123 640.4, filed Sep. 15, 2022, the entire disclosures of which are incorporated by reference herein.

TECHNICAL FIELD

The present disclosure relates to a brake device for an electrically operatable axle drivetrain of a motor vehicle, wherein the brake device can be coupled to a vehicle wheel of the motor vehicle such that actuation of the brake device brakes the vehicle wheel, wherein the brake device comprises a hydraulic disengaging system comprising a central disengaging element which actuates a friction device such that the friction device can be converted into a braking and non-braking operating state, and the central disengaging element additionally has a central disengaging element housing comprising an annular central disengaging element piston chamber in which a central disengaging element piston is received in an axially movable manner by a hydraulic liquid that can be supplied to the central disengaging element piston chamber, wherein the central disengaging element has at least one central disengaging element piston seal which seals off the central disengaging element piston from the central disengaging element piston chamber, and the central disengaging element and the friction device are received in a brake housing. The disclosure further relates to an electrically operatable axle drivetrain of a motor vehicle.

BACKGROUND

Electric motors are increasingly being used to drive motor vehicles to create alternatives to internal combustion engines that require fossil fuels. Significant efforts have already been made to improve the suitability of electric drives for everyday use and also to be able to offer users the driving comfort which they are accustomed to.

A detailed description of an electric drive can be found in an article in the German automotive magazine ATZ, volume 113, 05/2011, pages 360-365 by Erik Schneider, Frank Fickl, Bernd Cebulski and Jens Liebold with the title: Hochintegrativ und Flexibel Elektrische Antriebseinheit für E-Fahrzeuge [Highly Integrative and Flexible Electric Drive Unit for E-Vehicles]. This article describes a drive unit for an axle of a vehicle, which comprises an electric motor that is arranged so as to be concentric and coaxial with respect to a bevel gear differential, wherein a shiftable 2-speed planetary gear set is arranged in the drivetrain between the electric motor and the bevel gear differential and is likewise positioned to be coaxial with the electric motor and the bevel gear differential or spur gear differential. The drive unit is very compact and allows for a good compromise between gradability, acceleration and energy consumption due to the shiftable 2-speed planetary gear set. Such drive units are also referred to as e-axles or electrically operatable drivetrains.

SUMMARY

There is a continuing need for such axle drivetrains to provide a variety of different operating modes for the driver or vehicle controller in order to provide the highest level of energy efficiency, comfort and safety.

It is therefore the object of the disclosure to provide a brake device for an electrically operatable axle drivetrain of a motor vehicle, which has a structure that is as simple and cost-effective as possible. Furthermore, it is the object of the disclosure to realize an electrically operatable axle drivetrain for a motor vehicle, which provides a plurality of different operating modes.

This object is achieved by a brake device for an electrically operatable axle drivetrain of a motor vehicle, wherein the brake device can be coupled to a vehicle wheel of the motor vehicle such that actuation of the brake device brakes the vehicle wheel, wherein the brake device comprises a hydraulic disengaging system comprising a central disengaging element which actuates a friction device such that the friction device can be converted into a braking and non-braking operating state, and the central disengaging element additionally has a central disengaging element housing comprising an annular central disengaging element piston chamber in which a central disengaging element piston is received in an axially movable manner by a hydraulic liquid that can be supplied to the central disengaging element piston chamber, wherein the central disengaging element has at least one central disengaging element piston seal which seals off the central disengaging element piston from the central disengaging element piston chamber, and the central disengaging element and the friction device are received in a brake housing, wherein the brake housing is designed in two parts, comprising a first pot-shaped housing part and a second lid-shaped housing part which at least partly covers the first pot-shaped housing part, wherein the first pot-shaped housing part forms the central disengaging element housing of the central disengaging element.

This has the advantage that a separate central disengaging element housing is not required, which brings both cost and assembly advantages. The pot-shaped housing part is preferably formed in one piece so that it has no unnecessary sealing points and is therefore particularly suitable for a wet-running friction device, as appropriate sealing measures can be reduced to a minimum. To receive the central disengaging element piston, the first pot-shaped housing part can, for example, have an annular circumferential groove, into which the central disengaging element piston is guided in an axially displaceable manner.

In particular, the brake housing also prevents dust from the friction device from entering the environment, which contributes to lower environmental impacts during operation of the brake devices. Furthermore, braking noise can be well damped by the housing.

The individual elements of the claimed subject matter of the disclosure are explained first in the order in which they are mentioned in the claims, after which particularly preferred embodiments of the subject matter of the disclosure are described.

The central disengaging element for actuating the brake device is preferably intended for use in a hydraulic disengaging system. A hydraulic disengaging system usually has a master cylinder that transmits the pressure generated on the master cylinder to the slave cylinder, in this case a central disengaging element, via a hydraulic pressure line. The hydraulic pressure can in particular also be provided by means of a power pack, which consists of a hydraulic pump and a hydraulic accumulator that can be acted upon by the hydraulic pump. In this case, a pressure chamber of the slave cylinder can also be pressurized hydraulically, for example, by a master cylinder that is controlled by a control unit by means of an electric motor, or by a hydraulic pump, optionally with the cooperation of a pressure accumulator. A power pack can be used in an advantageous manner, which switches a plurality of pressure circuits, in particular, via a central hydraulic pump and corresponding valves.

Thus, the hydraulic disengaging system particularly preferably actuates a friction device of the brake device hydraulically by acting on the master cylinder. This can be done—as explained—either by means of an actuator that is controlled by a control unit or for example by manual actuation by the driver using a brake pedal.

The central disengaging element is particularly preferably usable in a clutch system for motor vehicles. The clutch system can have the function of engaging or disengaging the driving side of the motor in a drive train of a vehicle from the transmission side in a shiftable manner and thus enabling, for example, a gear change of the transmission while driving and thereby being able to operate the driving motor in a preferred speed/torque range, or to engage an electric motor or an internal combustion engine from or into a drive train.

A clutch system within the meaning of this application can also be a braking system, wherein at least part of the torque-transmitting friction device is designed to be non-rotatable.

For the purposes of this application, motor vehicles are land vehicles that are moved by machine power without being bound to railroad tracks. A motor vehicle can be selected, for example, from the group of passenger cars, trucks, small motorcycles, light motor vehicles, motorcycles, motor buses/coaches or tractors.

A central disengaging element according to the disclosure has a central disengaging element housing. The central disengaging element housing has the function of receiving components of the central disengaging element, in particular the moving central disengaging element pistons, and protecting them from external mechanical or chemical influences. Furthermore, the central disengaging element housing has the function of allowing for simple assembly and fixing of the central disengaging element within the drivetrain. The central disengaging element housing can be made in one piece or in multiple pieces. The central disengaging element housing can preferably be formed from a plastic, a metallic material and/or a ceramic material. The central disengaging element piston chamber formed in the central disengaging element housing serves to receive and guide the central disengaging element piston, which is linearly movably mounted in the central disengaging element housing.

Preferably, the central disengaging element housing is formed integrally, in particular monolithically, with the first pot-shaped housing part.

The central disengaging element also has a central disengaging element piston. The central disengaging element piston has the function of converting hydraulic pressurization into a linear displacement of the central disengaging element piston, wherein the effect of which is that the clutch system can be converted from an engaged operating state to a disengaged operating state. The central disengaging element can have an annular central disengaging element piston or several central disengaging element pistons (multi-piston disengaging elements).

Furthermore, the central disengaging element has at least one central disengaging element piston seal. The central disengaging element piston seal seals the central disengaging element piston, which is guided for linear movement, against the central disengaging element housing that receives the central disengaging element piston. The central disengaging element piston seal can be designed in particular as a sealing ring. It is particularly preferred that the central disengaging element piston seal is formed from an elastic, particularly preferably rubber-elastic material. The elastic material can preferably consist entirely or partially of an elastomer, wherein the elastomers in turn are preferably selected from the group of natural rubber vulcanizates and silicone rubber.

In a hydraulic disengaging system of a motor vehicle, the hydraulic liquid has the function of transmitting energy in the form of pressure with as little loss as possible, for example within a vehicle's brake and/or clutch system. In addition to this main object, the hydraulic liquid can in particular also provide lubrication and corrosion protection for the moving parts and the metal surfaces of the hydraulic disengaging system. In addition, it can in particular also dissipate impurities (for example due to abrasion), water and air as well as waste heat.

According to a further particularly preferred embodiment of the disclosure, it can be provided that the central disengaging element piston and/or the central disengaging element housing is/are formed from a plastic. This has the particular effect that the central disengaging element can be cost-effectively manufactured and designed to be particularly weight-optimized.

Advantageous embodiments of the disclosure are specified in the dependent claims. The features listed individually in the dependent claims can be combined with one another in a technologically meaningful manner and can define further embodiments of the disclosure. In addition, the features indicated in the claims are specified and explained in more detail in the description, wherein further preferred embodiments of the disclosure are shown.

According to an advantageous embodiment of the disclosure, it can be provided that the brake housing has a shaft passing through it, which is connected to the friction device of the brake device in a torque-transmitting manner, wherein the shaft is mounted relative to the pot-shaped first housing part by means of a first rolling bearing and a first bearing seat of the first rolling bearing is formed on the first pot-shaped housing part. The advantage of this design is that the degree of system integration on the first housing part can be further increased by the first housing part providing a bearing seat for a first rolling bearing in addition to the central disengaging element.

According to a further preferred further development of the disclosure, it can also be provided that the shaft is mounted relative to the pot-shaped first housing part by means of a second rolling bearing and a second bearing seat of the second rolling bearing is formed on the second lid-shaped housing part, which also contributes to improved system integration into the brake device.

Furthermore, according to a likewise advantageous embodiment of the disclosure, it can be provided that the second lid-shaped housing part is formed by a motor housing of an electric machine. The advantageous effect of this embodiment is based on the fact that the provision of a separate lid for closing the first, pot-shaped housing part can be omitted, which can also contribute to a cost-effective design of the brake device.

According to a further particularly preferred embodiment of the disclosure, it can be provided that the first, pot-shaped housing part is formed from sheet metal. This has the particular effect that the first housing part can be reformed, which is particularly advantageous in terms of manufacturing technology.

Furthermore, the disclosure can also be further developed such that the friction device is designed as a multi-disc brake, wherein a particularly favorable braking effect of the brake device can be achieved.

The function of a multi-disc brake is to establish a releasable, force-fitting connection between a clutch input shaft and a clutch output shaft to support a torque. The alternately arranged inner discs and outer discs of the disc pack can be brought into force-fitting or frictional contact by means of axial displacement and compression via their respective friction linings by means of a clutch engagement process, such that the inner discs rotate relative to the outer discs in a frictional manner around the common axis of rotation of the corresponding disc pack or are arranged such that they cannot rotate relative to each other in the event of a complete frictional engagement.

On the other hand, if the inner discs and outer discs are axially pushed away from each other by a disengagement process, there is no longer any force-fitting contact between the inner discs and the outer discs such that they can rotate freely against each other and consequently no rotational or braking torque is transmitted between the inner discs and the outer discs.

In a possible design of such a multi-disc brake, the clutch input shaft can be torsionally rigidly connected to the outer disc carrier of the multi-disc clutch. By means of an internal toothing of the outer disc carrier, all outer discs are then guided axially freely. The inner discs, which are also guided axially freely by the toothing of the inner disc carrier, are then arranged alternately between the outer discs. This means that all inner discs are torsionally rigidly connected to the clutch output shaft. When the multi-disc clutch is closed by actuating the central disengaging element, friction occurs between the outer and inner discs. The resulting frictional forces result in a force flow from the outer disc carrier to the inner disc carrier, which enables the torque transmission from the clutch input shaft to the clutch output shaft. When the central disengaging element is not actuated, the inner and outer discs separate, depending on the design, either through the action of a spring or—in the case of wet-running multi-disc brakes—through the flow of oil between the discs.

In connection with the present disclosure, the function of a multi-disc brake is to establish a releasable, force-fitting connection between a clutch input shaft and a clutch output shaft to support a rotational or braking torque.

A multi-disc brake usually consists of at least two inner and/or two outer discs. The inner discs are preferably arranged in a rotationally fixed manner on an inner disc carrier and the outer discs are preferably arranged in a rotationally fixed manner on an outer disc carrier. The inner disc carrier is connected in particular to a clutch output shaft and the outer disc carrier is connected in particular to a clutch input shaft or vice versa.

The inner and outer discs form the disc pack of the multi-disc brake. In the disc pack, a plurality of inner discs and outer discs are preferably arranged alternately to one another in the axial direction. The rotational or braking torque that can be transmitted by the multi-disc brake between the inner and outer discs can be adjusted by the number and design of the inner and outer discs.

The inner discs have the function of transmitting a torque from the outer discs to the inner disc carrier, in particular in a force-fitting or frictional manner. The inner discs can in particular be designed as circular discs. The inner discs can be connected in a rotationally fixed manner to the inner disc carrier of the multi-disc brake. It can also be provided that the inner discs can be displaced in the axial direction relative to the inner disc carrier, for example by means of a corresponding toothing, in order to establish frictional engagement with the outer discs.

The outer discs have the function of transferring a torque, in particular in a force-fitting or frictional manner, from the inner discs to the outer disc carrier. The outer discs can in particular be designed as circular discs. The outer discs can be connected in a rotationally fixed manner to the outer disc carrier of the multi-disc clutch. It can also be provided that the outer discs can be displaced in the axial direction relative to the outer disc carrier, for example by means of a corresponding toothing, in order to establish frictional engagement with the inner discs. The outer disc carrier can, for example, be designed as an outer disc clutch basket.

The multi-disc brake can preferably comprise a spring. The spring has the task of moving the inner and outer discs into a predefined position relative to each other using spring force. Usually, this predefined position corresponds to a "normally open" or "normally closed" operating state of the multi-disc brake, which means that when the central disengaging element is not actuated, the inner and outer discs are either pressed against each other by the spring or released.

The multi-disc brake is operated by the central disengaging element. The central disengaging element has the function of effecting a braking process of the multi-disc brake. This braking process can in particular be the engagement and/or disengagement of the multi-disc brake. As high forces may sometimes be required to engage or disengage the multi-disc brake, it can be provided, in particular, that the central disengaging element can be actuated by means of hydraulic power assistance.

Furthermore, the multi-disc brake can also have a switching piston. The switching piston has the function of converting the engagement and disengagement processes specified by the central disengaging element into an axial displacement of the inner discs and/or the outer discs for the purpose of creating a frictional engagement when engaging or releasing a frictional engagement when disengaging the multi-disc brake.

According to an advantageous embodiment of the disclosure, it can be provided that the inner discs and/or the outer discs are designed as steel discs. According to a further preferred further development of the disclosure, it can also be provided that the inner discs and/or outer discs have splines.

Furthermore, according to an equally advantageous embodiment of the disclosure, it can be provided that the inner discs are received in an inner disc carrier and/or the outer discs are received in an outer disc carrier.

In an equally preferred embodiment of the disclosure, it can also be provided that the shaft has an axially extending first fluid channel and a second fluid channel branching off therefrom and extending radially outwards through the shaft, at the outlet of which a cooling fluid for cooling the friction device can enter the brake device, wherein the first, pot-shaped housing part has a first connection opening for the inlet of the cooling fluid into the first fluid channel of the shaft, and also provides a second connection opening for the outlet of the cooling fluid from the brake device.

This means that the brake device can be cooled effectively. Furthermore, it is possible to design the brake device with a wet-running friction device. The dissipated heat can then be used within a vehicle, for example, for climate control within the passenger compartment.

The object of the disclosure is further achieved by an electrically operatable axle drivetrain of a motor vehicle, comprising an electric machine with a stator and a rotor rotatable thereto for driving at least one vehicle wheel of the motor vehicle, and a brake device which can be coupled to the vehicle wheel of the motor vehicle such that actuation of the brake device brakes the vehicle wheel, wherein the brake device is designed according to one of claims 1-7.

According to a further preferred embodiment of the subject matter of the disclosure, it can be provided that the rotor of the electric machine and the shaft of the brake device run coaxially to one another. Finally, the disclosure can also be advantageously designed such that the rotor of the electric machine is permanently connected to the shaft of the brake device in a torque-transmitting manner.

The disclosure is explained in more detail below with reference to figures without limiting the general concept of the disclosure.

DETAILED DESCRIPTION

Figure 1:
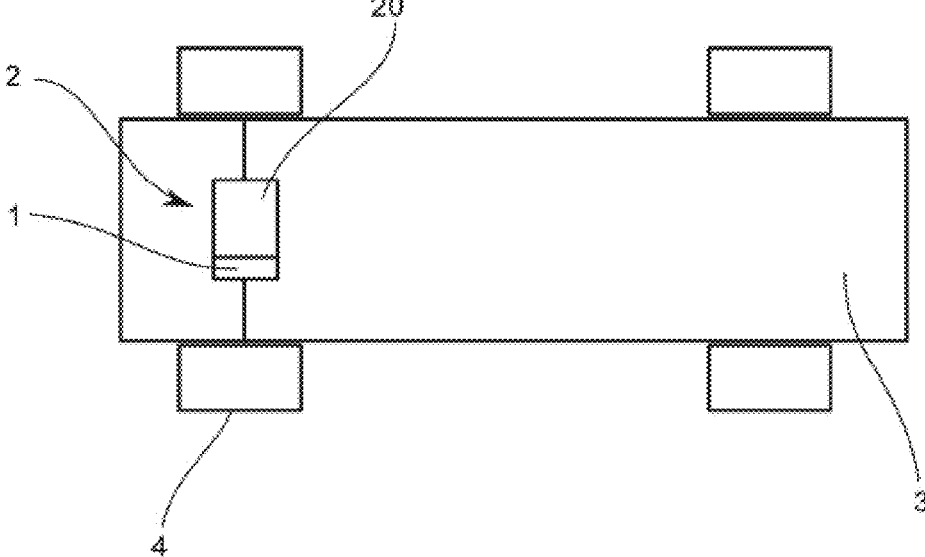
FIG. 1 shows a motor vehicle having an electric axle drivetrain and a brake device in a schematic block diagram.

FIG. 1 shows a brake device 1 in an electrically operatable axle drivetrain 2 of a motor vehicle 3, wherein the brake device 1 can be coupled to a vehicle wheel 4 of the motor vehicle 3 such that an actuation of the brake device 1 brakes the vehicle wheel 4.

Figure 2:
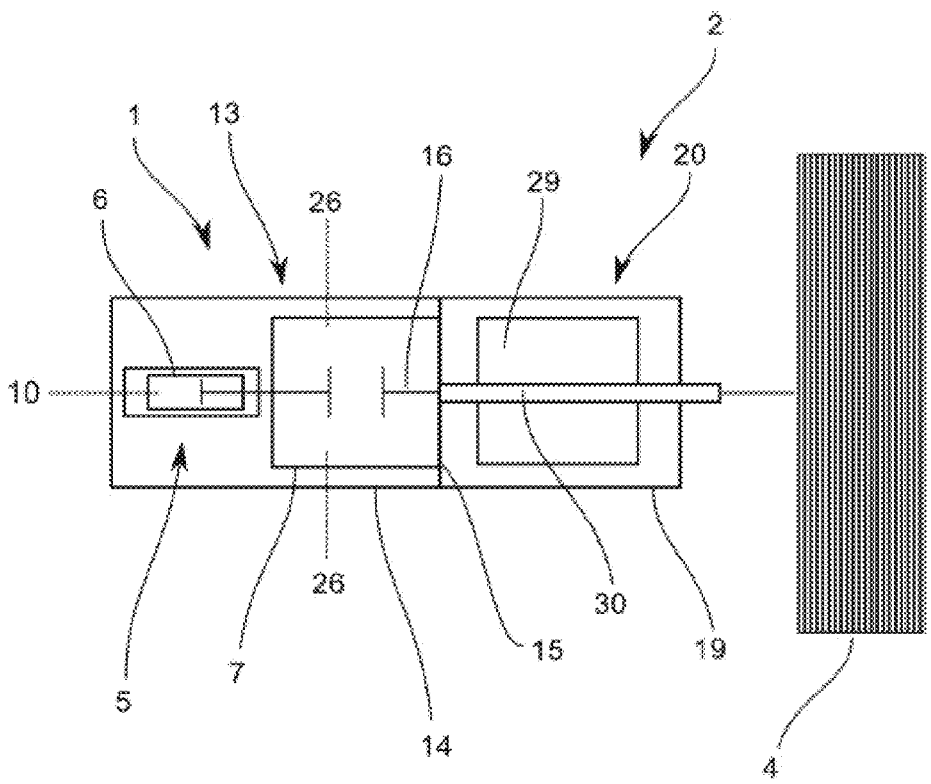
FIG. 2 shows an axle drivetrain having a brake device in a schematic block diagram.

For this purpose, the brake device 1, as can be seen in FIG. 2, has a hydraulic disengaging system 5 comprising a central disengaging element 6 which actuates a friction device 7 such that the friction device can be converted into a braking and non-braking operating state.

Figure 3:
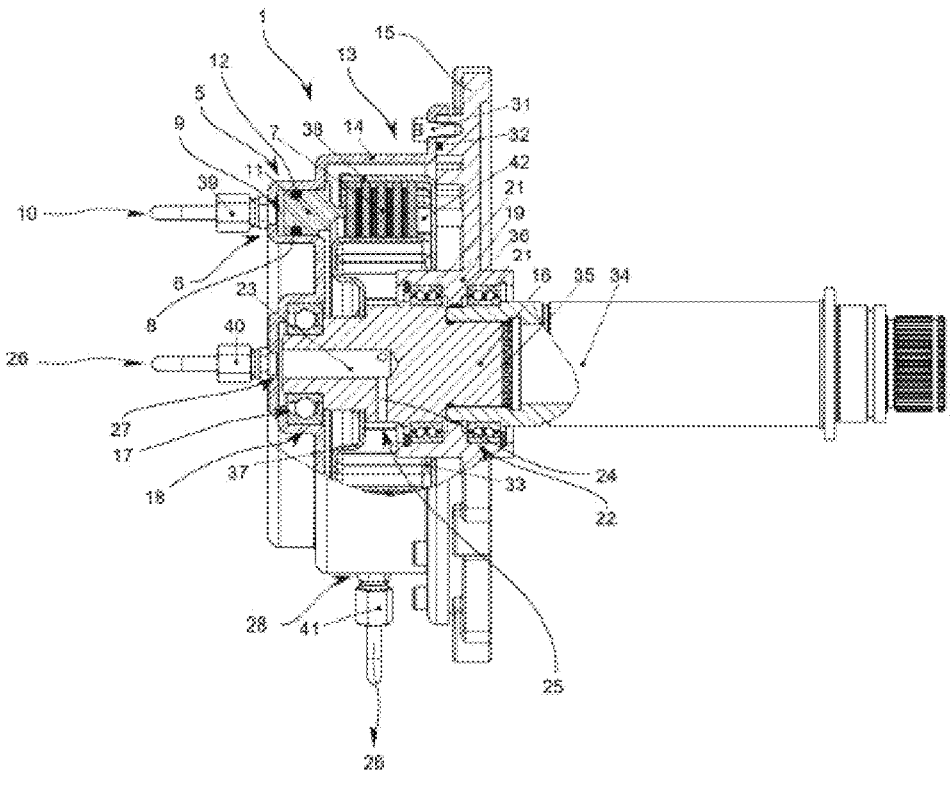
FIG. 3 shows a brake device in an axial sectional view.

The central disengaging element 6 has a central disengaging element housing 8 comprising an annular central disengaging element piston chamber 9 in which a central disengaging element piston 11 is received in an axially movable manner by a hydraulic liquid 10 that can be supplied to the central disengaging element piston chamber 9, wherein the central disengaging element 6 has at least one central disengaging element piston seal 12 which seals off the central disengaging element piston 11 from the central disengaging element piston chamber 9, which is clearly illustrated in FIG. 3.

The central disengaging element 6 and the friction device 7 are received in a brake housing 13, wherein the brake housing 13 is designed in two parts, comprising a first pot-shaped housing part 14 and a second lid-shaped housing part 15 which at least partly covers the first pot-shaped housing part 15. As shown in FIGS. 2-3, the lid-shaped second housing part 15 is formed by a motor housing 19 of an electric machine 20. The first pot-shaped housing part 14 is formed from a sheet metal and forms the central disengaging element housing 8 of the central disengaging element 6.

The central disengaging element piston chamber 9 of the central disengaging element 6 is incorporated into the one-piece, first pot-shaped housing part 14 of the brake device 1. The first housing part 14 thus forms the central disengaging element housing 8. This central disengaging element piston chamber 9 is designed as a coaxial ring in which the central disengaging element piston 11 is axially displaceable. On the outer diameter of the first, pot-shaped housing part 14, a plurality of through holes are arranged, through which the first housing part 14 is connected to the second, lid-shaped housing part 15 of the electric machine 20 by means of fastening screws 31. The fastening screws 31 absorb axial forces acting during operation and transfer them to the second housing part 15 of the electric machine 20. An O-ring groove with a seal 32 is arranged in the second housing part 15 of the electric machine 20 near the fastening screws 31. This serves to seal the wet chamber of the brake device 1 from the environment.

By means of cylindrical domes 42, which are incorporated in the second housing part 15 of the electric machine 20, the disc pack of the multi-disc brake is positioned and supported axially in the direction of the electric machine 20. The outer surface of the cylindrical domes 42 supports the torque acting during operation via the counter geometry arranged in the outer disc carrier 38 and transmits it into the second housing part of the electric drive machine 20. The outer disc carrier 38 is connected to the second housing part 15 of the electric machine 20 via fastening screws 33 and secured axially.

The brake housing 13 has a shaft 16 passing through it, which is connected to the friction device 7 of the brake device 1 in a torque-transmitting manner, wherein the shaft 16 is mounted relative to the pot-shaped first housing part 14 by means of a first rolling bearing 17 and a first bearing seat 18 of the first rolling bearing 17 is formed on the first pot-shaped housing part 14. Furthermore, the shaft 16 is mounted relative to the pot-shaped first housing part 14 by means of a second rolling bearing 21 and a second bearing seat 22 of the second rolling bearing 21 is formed accordingly on the second lid-shaped housing part 15. The rotor 30 of the electric machine 20 and the shaft 16 of the brake device 1 run coaxially to one another and the rotor 30 of the electric machine 20 is permanently connected to the shaft 16 of the brake device 1 in a torque-transmitting manner.

FIG. 3 also shows that the friction device 7 is designed as a multi-disc brake. What can also be seen from FIG. 3 is that the shaft 16 has a coaxially extending first fluid channel 23 and a second fluid channel 24 branching off therefrom and extending radially outwards through the shaft (16), at the outlet 25 of which a cooling fluid 26 for cooling the friction device 7 can enter the brake device 1, wherein the first, pot-shaped housing part 14 has a first connection opening 27 for the inlet of the cooling fluid 26 into the first fluid channel 23 of the shaft 16, and also provides a second connection opening 28 for the outlet of the cooling fluid 26 from the brake device 1. This enables the fluid transfer between the cooling fluid line 40 via the fluid channels 23, 24 to the inner diameter of the inner disc carrier 37. Boreholes are arranged in the inner disc carrier 37 through which the cooling fluid 26 can reach the disc pack of the multi-disc brake. The cooling fluid 26 reaches the inner wall of the first, pot-shaped housing part 14 via boreholes arranged in the outer disc carrier 38. From there, the cooling fluid 26 reaches the line 41, through which the cooling fluid 26 is discharged from the brake housing 13.

The shaft 16 of the brake device 1 is connected via a toothing 35 to the rotor shaft 34 of the electric machine 20 such that both speed and torque can be transmitted. The bearing of the shaft 16 of the brake device 1 is arranged in the motor housing 19 of the electric machine 20. Furthermore, a sliding band 36 is arranged in the same component.

Figure 4:
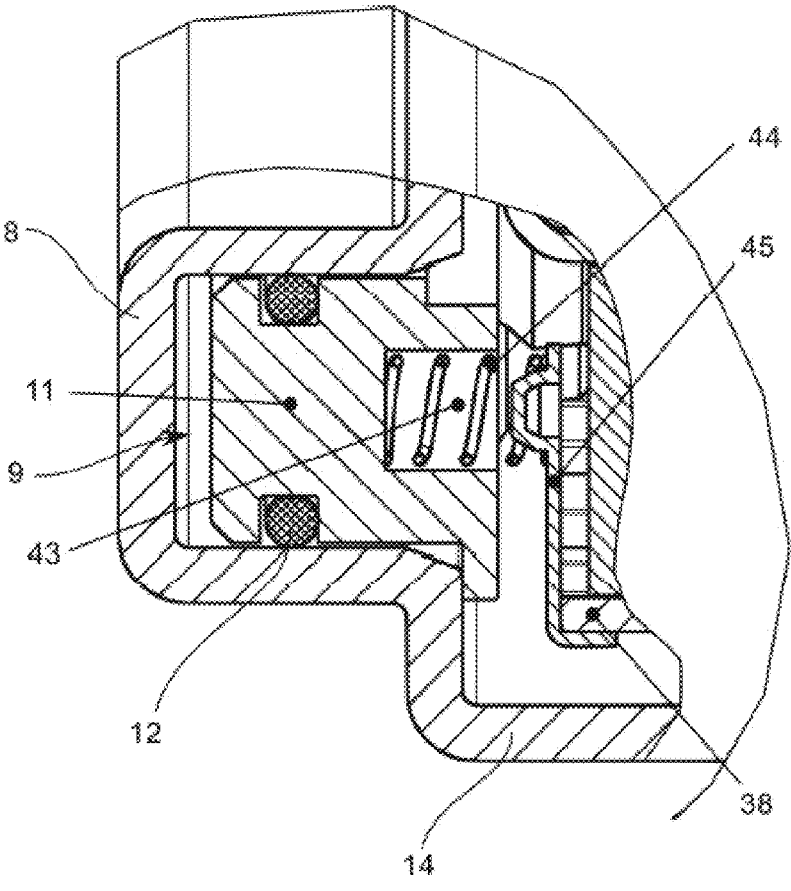
FIG. 4 shows a detailed view of a central disengaging element in an axial sectional view.

FIG. 4 shows the reset mechanism of the central disengaging element 6 in detail. The support plate 45 of the preload spring 44 is arranged on the axially fixed and non-rotating outer disc carrier 38. Domes for positioning the inner diameter of the preload spring 44, which is designed as a helical spring, are arranged in the support plate 45. A cylindrical receptacle 43 for the preload spring 44 is arranged in the central disengaging element piston 11. The geometry with which the central disengaging element piston 11 presses on the disc pack of the multi-disc brake is interrupted in the area of the cylindrical receptacle 43. The distance between the support plate 45, the preload spring 44 and the upper edge of the central disengaging element piston 11 defines the maximum disengagement travel of the central disengaging element piston 11. When actuated, the axial force required to overcome the spring force of the preload springs 44 must be applied in addition to the axial force required to generate the braking torque. If no axial force is required to generate a braking torque, the preload spring 44 pushes the central disengaging element piston 11 away from the disc pack. In this case, a stop is incorporated into the central disengaging element piston 11, which comes into contact with the first housing part 14 over a defined distance and thus limits the maximum distance of the central disengaging element piston 11 relative to the disc pack.

The terms "radial," "axial," "tangential" and "circumferential direction" used in this application always refer to the axis of rotation of the shaft of the brake device. The terms "left," "right," "above," "below," "over," and "under" are used here only to clarify which areas of the illustrations are currently being described in the text. The later embodiment of the disclosure may also be arranged differently. The disclosure is further not limited to the embodiments shown in the figures. The above description is therefore not to be regarded as limiting, but rather as illustrative. The following claims are to be understood as meaning that a stated feature is present in at least one embodiment of the disclosure. This does not exclude the presence of further features. Where the claims and the above description define 'first' and 'second' features, this designation serves to distinguish between two features of the same type without defining an order of precedence.

LIST OF REFERENCE SIGNS

1 Brake device
2 Axle drivetrain
3 Motor vehicle
4 Vehicle wheel
5 Disengaging system
6 Central disengaging element
7 Friction device
8 Central disengaging element housing
9 Central disengaging element piston chamber
10 Hydraulic liquid
11 Central disengaging element piston
12 Central disengaging element piston seal
13 Brake housing
14 Housing part
15 Housing part
16 Shaft
17 Rolling bearing
18 Bearing seat
19 Motor housing
20 Electric machine
21 Rolling bearing
22 Bearing seat

23 Fluid channel
24 Fluid channel
25 Outlet
26 Cooling fluid
27 Connection opening
28 Connection opening
29 Stator
30 Rotor
31 Fastening screw
32 Seal
33 Fastening screw
34 Rotor shaft
35 Toothing
36 Sliding band
37 Inner disc carrier
38 Outer disc carrier
39 Pressure line
40 Cooling fluid line
41 Cooling fluid line
42 Cylindrical dome
43 Receptacle
44 Preload spring
45 Support plate

The invention claimed is:

1. A brake device for an electrically operatable axle drivetrain of a motor vehicle, wherein the brake device can be coupled to a vehicle wheel of the motor vehicle such that an actuation of the brake device brakes the vehicle wheel, wherein the brake device comprises:
a hydraulic disengaging system comprising a central disengaging element which actuates a friction device such that the friction device can be converted into a braking and non-braking operating state, and the central disengaging element additionally has a central disengaging element housing comprising an annular central disengaging element piston chamber in which a central disengaging element piston is received in an axially movable manner by a hydraulic liquid that can be supplied to the central disengaging element piston chamber, wherein the central disengaging element has at least one central disengaging element piston seal which seals off the central disengaging element piston from the central disengaging element piston chamber,
wherein the central disengaging element and the friction device are received in a brake housing,
wherein the brake housing comprises a first pot-shaped housing part and a second lid-shaped housing part which at least partly covers the first pot-shaped housing part, wherein a shaft passes the brake housing, the shaft being connected to the friction device of the brake device in a torque-transmitting manner, the shaft being mounted relative to the first pot-shaped housing part via a first rolling bearing, a first bearing seat of the first rolling bearing formed on the first pot-shaped housing part,
wherein the first pot-shaped housing part forms the central disengaging element housing of the central disengaging element.

2. The brake device according to claim 1,
wherein the shaft is mounted relative to the pot-shaped first housing part by means of a second rolling bearing and a second bearing seat of the second rolling bearing is formed on the second lid-shaped housing part.

3. The brake device according claim 1, wherein the lid-shaped second housing part is formed by a motor housing of an electric machine.

4. The brake device according to claim 1, wherein the first, pot-shaped housing part is formed from a sheet metal.

5. The brake device according to claim 1, wherein the friction device is designed as a multi-disc brake.

6. The brake device according to claim 1, wherein the shaft has an axially extending first fluid channel and a second fluid channel branching off therefrom and extending radially outwards through the shaft, at the outlet of which a cooling fluid for cooling the friction device can enter the brake device, wherein the first, pot-shaped housing part has a first connection opening for the inlet of the cooling fluid into the first fluid channel of the shaft, and also provides a second connection opening for the outlet of the cooling fluid from the brake device.

7. An electrically operatable axle drivetrain of a motor vehicle, comprising an electric machine with a stator and a rotor rotatable thereto for driving at least one vehicle wheel of the motor vehicle, and a brake device which can be coupled to the vehicle wheel of the motor vehicle such that actuation of the brake device brakes the vehicle wheel, wherein the brake device is designed according to claim 1.

8. The axle drivetrain according to claim 7, wherein the rotor of the electric machine and the shaft of the brake device run coaxially to one another.

9. The axle drivetrain according to claim 7, wherein the rotor of the electric machine is permanently connected to the shaft of the brake device in a torque-transmitting manner.

10. A brake device for an electrically operatable axle drivetrain of a motor vehicle, the brake device comprising:

a hydraulic disengaging system comprising a central disengaging element configured to actuate a friction device such that the friction device can be converted into a braking and non-braking operating state, wherein the central disengaging element includes a central disengaging element housing comprising an annular central disengaging element piston chamber in which a central disengaging element piston is received in an axially movable manner by a hydraulic liquid supplied to the central disengaging element piston chamber, wherein the central disengaging element includes at least one central disengaging element piston seal configured to seal off the central disengaging element piston from the central disengaging element piston chamber, wherein the central disengaging element and the friction device are received in a brake housing, wherein the brake housing comprises a first pot-shaped housing part and a second lid-shaped housing part at least partly covering the first pot-shaped housing part, wherein the first pot-shaped housing part forms the central disengaging element housing of the central disengaging element, wherein the second lid-shaped second housing part is formed by a motor housing of an electric machine; and a shaft, wherein the shaft passes through the brake housing and is connected to the friction device of the brake device in a torque-transmitting manner, wherein the shaft is mounted relative to the first pot-shaped housing part by a first rolling bearing and a first bearing seat of the first rolling bearing is formed on the first pot-shaped housing part.

11. The brake device according to claim 10, wherein the shaft is mounted relative to the first pot-shaped housing part by a second rolling bearing and a second bearing seat of the second rolling bearing is formed on the second lid-shaped housing part.

12. The brake device according to claim 10, wherein the first pot-shaped housing part is formed from a sheet metal.

13. The brake device according to claim 10, wherein the friction device comprises a multi-disc brake.

14. The brake device according to claim 10, wherein the shaft includes an axially extending first fluid channel and a second fluid channel branching off therefrom and extending radially outwards through the shaft, at the outlet of which a cooling fluid for cooling the friction device can enter the brake device, wherein the first, pot-shaped housing part includes a first connection opening for the inlet of the cooling fluid into the first fluid channel of the shaft, and provides a second connection opening for the outlet of the cooling fluid from the brake device.

15. An electrically operatable axle drivetrain of a motor vehicle comprising:

an electric machine including a stator and a rotor for driving at least one vehicle wheel of the motor vehicle, and a brake device coupled to the vehicle wheel of the motor vehicle such that actuation of the brake device brakes the vehicle wheel, wherein the brake device comprises:

a hydraulic disengaging system comprising a central disengaging element configured to actuate a friction device such that the friction device can be converted into a braking and non-braking operating state, wherein the central disengaging element includes a central disengaging element housing comprising an annular central disengaging element piston chamber in which a central disengaging element piston is received in an axially movable manner by a hydraulic liquid supplied to the central disengaging element piston chamber, wherein the central disengaging element includes at least one central disengaging element piston seal configured to seal off the central disengaging element piston from the central disengaging element piston chamber, wherein the central disengaging element and the friction device are received in a brake housing, wherein the brake housing comprises a first pot-shaped housing part and a second lid-shaped housing part at least partly covering the first pot-shaped housing part, wherein the first pot-shaped housing part forms the central disengaging element housing of the central disengaging element, wherein the second lid-shaped second housing part is formed by a motor housing of an electric machine; and a shaft, wherein the shaft passes through the brake housing and is connected to the friction device of the brake device in a torque-transmitting manner, wherein the shaft is mounted relative to the first pot-shaped housing part by a first rolling bearing and a first bearing seat of the first rolling bearing is formed on the first pot-shaped housing part.

16. The axle drivetrain according to claim 15, wherein the rotor of the electric machine and the shaft of the brake device run coaxially to one another.

17. The axle drivetrain according to claim 15, wherein the rotor of the electric machine is connected to the shaft of the brake device in a torque-transmitting manner.

* * * * *